United States Patent

Hoover et al.

[15] 3,668,138

[45] June 6, 1972

[54] METHOD OF INHIBITING CORROSION WITH AMINO DIPHOSPHONATES

[72] Inventors: Merwin Frederick Hoover, Pittsburgh; Gloria Di Marco Sinkovitz, Bridgeville; Andrew Martin Ruland, Pittsburgh, all of Pa.

[73] Assignee: Calgon Corporation, Pittsburgh, Pa.

[22] Filed: Nov. 27, 1970

[21] Appl. No.: 93,419

[52] U.S. Cl. .................................. 252/181, 21/2.7, 106/14, 252/8.55 E, 252/180, 252/387, 252/389, 260/502.4 P

[51] Int. Cl. .................... C02b 5/06, C23f 11/16, C23f 14/07

[58] Field of Search .................... 252/389, 387, 8.55 E, 180, 252/181, 87; 21/2.7; 260/502.4 P; 106/14

[56] References Cited

UNITED STATES PATENTS

| | | | |
|---|---|---|---|
| 3,303,139 | 2/1969 | Blaser et al. | 252/180 |
| 3,483,133 | 12/1969 | Hatch et al. | 252/389 |
| 3,518,203 | 6/1970 | Savinelli et al. | 21/2.7 |
| 3,532,639 | 10/1970 | Hatch | 252/389 |
| 3,600,470 | 8/1971 | Lewis | 252/389 |

*Primary Examiner*—Leon D. Rosdol
*Assistant Examiner*—Irwin Gluck
*Attorney*—William L. Krayer and Herbert J. Zeh, Jr.

[57] ABSTRACT

Amino diphosphonic acid compounds and water-soluble salts thereof alone and in combination with zinc are disclosed as inhibiting the corrosion of metals in contact with water.

8 Claims, No Drawings

METHOD OF INHIBITING CORROSION WITH AMINO DIPHOSPHONATES

BACKGROUND OF THE INVENTION

This invention relates to corrosion inhibiting in water systems, particularly industrial water systems which utilize oxygen-bearing waters. More particularly, this invention relates to the use of amino diphosphonic acid compounds alone and in combination with zinc as corrosion inhibitors.

Corrosion is a problem in almost every system where metal contacts water. This problem is very serious in most industrial water systems since they contain large amounts of corrosive ingredients. The major corrosive ingredients found in these systems are dissolved gases such as carbon dioxide and oxygen and inorganic salts such as the calcium, magnesium, and sodium salts of carbonate, bicarbonate, chloride and sulfate. These ingredients are especially corrosive to iron and steel which are extensively used in industrial water systems. However, copper and its alloys, aluminum and its alloys, and galvanized steel are also used in aqueous systems and are subject to the corrosive effects of the above-mentioned ingredients. Therefore, it is necessary to treat industrial water systems to prevent corrosion. Heretofore, the corrosion inhibitors in most widespread use have contained either inorganic polyphosphates or soluble chromates or combinations thereof. However, polyphosphates are hydrolytically unstable and have a tendency to hydrolyze and revert to the orthophosphate form which may form undesirable deposits. In addition, the toxic chromate containing corrosion inhibitors present a waste disposal problem. Therefore, a new class of corrosion inhibitors is desired.

SUMMARY OF THE INVENTION

We have found that amino diphosphonic acid compounds and water-soluble salts thereof alone, and especially, in combination with zinc are excellent corrosion inhibitors for industrial water systems. The amino diphosphonic acid compounds of our invention may be represented by the following formula

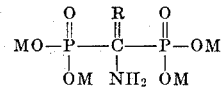

where R is an alkyl group of one to five carbon atoms, phenyl, or benzyl and each M is independently selected from the group consisting of hydrogen, zinc, alkali metal, and ammonium. The preferred compounds of our invention are when R is methyl or phenyl and M is hydrogen and/or sodium. The compounds of our invention may be named as substituted 1-amino-methane-1,1-diphosphonic acid. For example, when R is phenyl, the compound is called 1-amino-1,phenyl methane-1,1-diphosphonic acid ($\alpha$ amino benzyl diphosphonic acid) and when R is methyl, the compound is called 1-amino-1,methyl methane-1,1-diphosphonic acid ($\alpha$ amino ethane diphosphonic acid).

The amino phosphonic acid compounds of our invention are not novel. For example, see Blaser et al., U.S. Pat. No. 3,303,139, which is directed to the use of similar amino diphosphonates as metal complexing agents. See, also, U.S. Pat. Nos. 3,202,579; 3,317,340 and 3,446,582. However, heretofore these compounds have never been employed as corrosion inhibitors.

There are many different methods for preparing the applicable amino diphosphonates as is known by one skilled in the art. Our invention is independent of the method employed to synthesize the amino phosphonates. We have prepared the compounds of our invention by using three different processes. The compounds were prepared by reacting an appropriate organic nitrile with a phosphorous trihalide in the presence of acetic acid. Then, this intermediate was hydrolyzed with water to yield the amino diphosphonic acid. We have also prepared the compounds by reacting the organic nitrile with an alcohol to form an imino ether. The imino ether was then reacted with a phosphite and hydrolyzed to yield the amino phosphonic acid. Finally, we have prepared the compounds of our invention by reacting an acid chloride with a phosphite and ammonia and hydrolyzing this reaction product to obtain the amino phosphonate.

Our amino diphosphonates will inhibit corrosion of metals when maintained in a water system at concentrations of at least about 20 ppm, preferably we desire to use about 50 ppm or more. The maximum concentration will largely be determined by economic considerations. However, for all practical purposes, a concentration greater than 500 ppm will never be used. As realized by one skilled in the art, the concentration of amino diphosphonate needed to effectively inhibit corrosion will ultimately depend on the characterization of the water system being treated and the particular amino diphosphonate being used. Therefore, the concentration ranges given herein are merely a general indication of the amount of amino diphosphonate needed and the exact concentration and particular compound will be determined by an examination of the water system being treated.

While the amino phosphonates of our invention will inhibit corrosion when used alone, we have found that they are much more effective when used in combination with zinc ion. The use of the amino diphosphonate in combination with zinc ions inhibits corrosion more effectively than the use of the amino phosphonate alone or the zinc ions alone. This combination of amino diphosphonate and zinc ions is a synergistic combination. When using the zinc amino phosphonate combination, the amino diphosphonate is employed in concentrations ranging from 3 ppm to 100 ppm and the zinc ion is employed in concentrations ranging from 3 ppm to 100 ppm. Preferably, the amino diphosphonate is used in a concentration range of 5 to 50 ppm and the zinc ion is used in a concentration range of 5 to 50 ppm. The ratio of zinc to organic amino diphosphonate may vary from 1:10 to 1:1, preferably from 1:5 to 1:2.5. The combination of amino diphosphonate and zinc will inhibit corrosion when used at concentrations of about 5 ppm, preferably we desire to use at least about 10 ppm. The upper limit is an economic consideration but, for all practical purposes, concentrations greater than 100 ppm will seldom, if ever, be needed.

When utilizing the combination of zinc ion and amino diphosphonate there are many different ways of adding the zinc ion as is realized by one skilled in the art. Our invention is independent of the method used to supply the zinc ion so long as the zinc ion is present in the appropriate concentrations. The zinc ion may be added by utilizing a water-soluble zinc salt which forms zinc ions in solution. Some examples of useful water-soluble zinc salts are zinc chloride, zinc acetate, zinc nitrate, and zinc sulfate. The zinc ion may also be supplied by adding zinc dust to an amino diphosphonic acid solution. The zinc dust reacts with the acid liberating hydrogen and forming a solution of the zinc salt of the amino diphosphonic acid. This method of adding the zinc ions is preferred when extraneous ions would be somewhat deleterious to the system. However, we prefer to use zinc salts, particularly zinc sulfate, to supply the zinc ion. Zinc sulfate is commercially available, economical and only very slightly hygroscopic, yet readily soluble in water.

The zinc ion and the amino diphosphonate may be added to the aqueous system separately or in combination. The easiest and preferred method is to add the compounds together. The amino diphosphonate and zinc salt may be admixed to form a dry composition which can be added to the water system as a dry composition or dissolved and fed into the system as a solution. Such a dry admixture consists of from about 10 to 70 percent by weight zinc salt and from about 20 percent to about 90 percent amino diphosphonate. The exact composition of the admixture is chosen to give the desired ratio of zinc to amino diphosphonate of from 1:10 to 1:1.

We have performed numerous experiments which demonstrate the effectiveness of our amino diphosphonates as corrosion inhibitors. These experiments were performed by running a rotating coupon holder corrosion test on the amino diphosphonates alone and in combination with zinc ion. In these experiments, number 1010AISI steel coupons were weighed and placed in beakers containing about 1,000 milliliters of water at 140° F and various amounts of the corrosion inhibitor compositions. The water contained about 45 ppm bicarbonate, 75 ppm chloride, 320 ppm sulfate, 80 ppm calcium, 25 ppm magnesium and had a total hardness as $CaCO_3$ of about 305 ppm and a pH of about 7.0. The coupons were rotated for 7 days. The water in the beakers was continuously being replaced at a rate of about 1,000 milliliters per 12 hours. In addition, each beaker was equipped with a gas dispersion tube which continuously bubbled air through the water thereby keeping the water saturated with oxygen. After agitation for seven days, the coupons were removed, cleaned and re-weighed. The amount of corrosion that had taken place was determined by the loss in weight of the coupons and expressed in terms of milligrams of metal consumed per square decimeter of surface area per day (mdd). The results are shown in the following tables.

TABLE 1

Inhibition of Corrosion of Steel with Zinc Ion and Alpha Aminobenzyl Diphosphonic Acid

| Example | Inhibitor Dosage in mg/l Diphosphonate | $Zn^{++}$ | Corrosion Rate in mdd |
|---|---|---|---|
| 1 | 25 | 0 | 1125 |
| 2 | 25 | 5 | 1017 |
| 3 | 25 | 7.5 | 11 |
| 4 | 50 | 0 | 900 |
| 5 | 50 | 10 | 12.3 |
| 6 | 50 | 15 | 11.5 |

TABLE 2

Inhibition of Corrosion of Steel with Zinc Ion and Alpha Aminobenzyl Diphosphonic Acid

| Example | Inhibitor Dosage in mg/l Diphosphonate | $Zn^{++}$ | Corrosion Rate in mdd |
|---|---|---|---|
| 7 | 25 | 2.5 | 955 |
| 8 | 25 | 5 | 554 |
| 9 | 25 | 7.5 | 803 |
| 10 | 25 | 8.3 | 668 |
| 11 | 25 | 10.0 | 12.1 |
| 12 | 25 | 12.5 | 13.3 |

TABLE 3

Inhibition of Corrosion of Steel with Zinc Ion and Alpha Aminobenzyl Diphosphonic Acid

| Example | Inhibitor Dosage in mg/l Diphosphonate | $Zn^{++}$ | Corrosion Rate in mdd |
|---|---|---|---|
| 13 | 25 | 2.5 | 666 |
| 14 | 25 | 5.0 | 11.1 |
| 15 | 25 | 7.5 | 9.6 |
| 16 | 25 | 8.3 | 8.7 |
| 17 | 25 | 10.0 | 7.9 |
| 18 | 25 | 12.5 | 7.3 |

In Table 3 the initial water had twice the dosage listed but the feed water contained the dosages listed in the table.

The data in the tables illustrate that the amino diphosphonates are effective corrosion inhibitors, especially in combination with zinc ion. Moreover, the conditions of the test were quite severe, being of an order of magnitude of five times the severity normally experienced in most aqueous systems. Therefore, the amino diphosphonates of our invention are quite effective corrosion inhibitors and may be used at concentrations much lower than illustrated in the tables.

We claim:

1. A composition useful for inhibiting the corrosion of metals in an aqueous system consisting essentially of a source of zinc ion and an amino diphosphonate of the formula

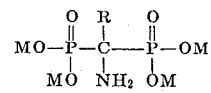

where R is selected from the group consisting of alkyl groups of one to five carbon atoms, phenyl and benzyl and each M is independently selected from the group consisting of hydrogen, alkali metal, ammonium and zinc and wherein the composition has a weight ratio of zinc ions to amino diphosphonate of from 1:10 to 1:1.

2. Composition of claim 1 wherein the source of zinc ion is a water-soluble zinc salt.

3. Composition of claim 1 wherein R is phenyl.

4. Composition of claim 1 wherein R is phenyl, M is selected from hydrogen and sodium, and the source of zinc ion is zinc sulfate.

5. Method of inhibiting the corrosion of metals in a water system comprising maintaining in the water of said system at least 20 ppm of an amino diphosphonate of the formula

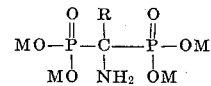

where R is selected from the group consisting of alkyl groups of one to five carbon atoms, phenyl and benzyl and where each M is independently selected from the group consisting of hydrogen, alkali metal and ammonium.

6. Method of claim 5 where R is phenyl and M is selected from hydrogen and sodium.

7. Method of inhibiting the corrosion of metals in a water system comprising maintaining in the water of said system about 3 to 100 ppm of zinc ion and about 3 to 100 ppm of an amino diphosphonate of the formula

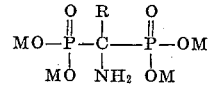

where R is selected from the group consisting of alkyl groups of one to five carbon atoms, phenyl, and benzyl and where each M is independently selected from the group consisting of hydrogen, alkali metal, zinc and ammonium.

8. Method of claim 7 where the source of zinc ion is zinc sulfate, R is phenyl, and M is selected from hydrogen and sodium.

* * * * *